United States Patent [19]

van der Hoeven

[11] Patent Number: 4,655,419
[45] Date of Patent: Apr. 7, 1987

[54] VORTEX GENERATOR

[75] Inventor: Antonius J. van der Hoeven, Bellevue, Wash.

[73] Assignee: The Boeing Company, Seattle, Wash.

[21] Appl. No.: 687,647

[22] Filed: Dec. 31, 1984

[51] Int. Cl.⁴ .............................................. B64C 23/06
[52] U.S. Cl. ................................................... 244/199
[58] Field of Search ................................. 244/199, 91

[56] References Cited

U.S. PATENT DOCUMENTS

| 2,532,753 | 7/1947 | Beman . | |
|---|---|---|---|
| 2,800,291 | 7/1957 | Stephens . | |
| 3,129,908 | 4/1964 | Harper . | |
| 3,263,945 | 8/1966 | Wimpenny | 244/199 |
| 3,288,399 | 11/1966 | Gaster . | |
| 3,348,597 | 4/1969 | Kasper . | |
| 3,463,418 | 8/1969 | Miksch . | |
| 3,471,107 | 10/1969 | Ornberg . | |
| 3,578,264 | 5/1971 | Kuethe . | |
| 3,744,745 | 7/1973 | Kerker et al. | 244/199 |
| 3,776,363 | 12/1973 | Kuethe . | |
| 3,845,918 | 11/1974 | White, Jr. . | |
| 4,067,518 | 1/1978 | Paterson et al. . | |
| 4,238,094 | 12/1980 | McGann . | |
| 4,323,209 | 4/1982 | Thompson . | |
| 4,378,922 | 4/1983 | Pierce | 244/199 |

FOREIGN PATENT DOCUMENTS

| 595877 | 4/1960 | Canada | 244/199 |
|---|---|---|---|
| 160134 | 8/1957 | Sweden . | |

Primary Examiner—Galen Barefoot
Assistant Examiner—Lynn M. Fiorito
Attorney, Agent, or Firm—Hughes & Cassidy

[57] ABSTRACT

A vortex generator mounted to an upper lifting surface of an airfoil, and having an upstanding generally planar vortex generating member. The forward edge portion of the member slants first upwardly and rearwardly from the airfoil surface, and then curves in a continuous convex rearward curve to blend into a substantially horizontal rearwardly extending upper edge portion. This vortex configuration alleviates unwanted secondary vortices.

20 Claims, 7 Drawing Figures

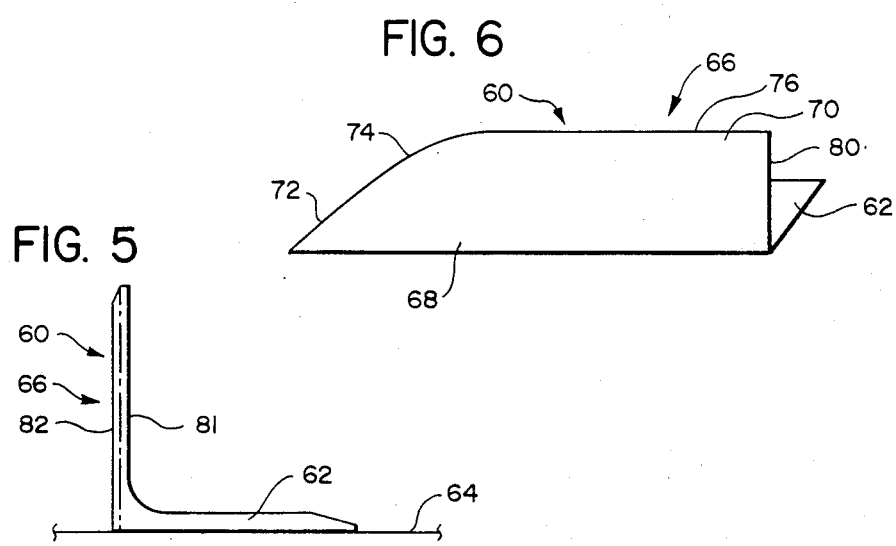
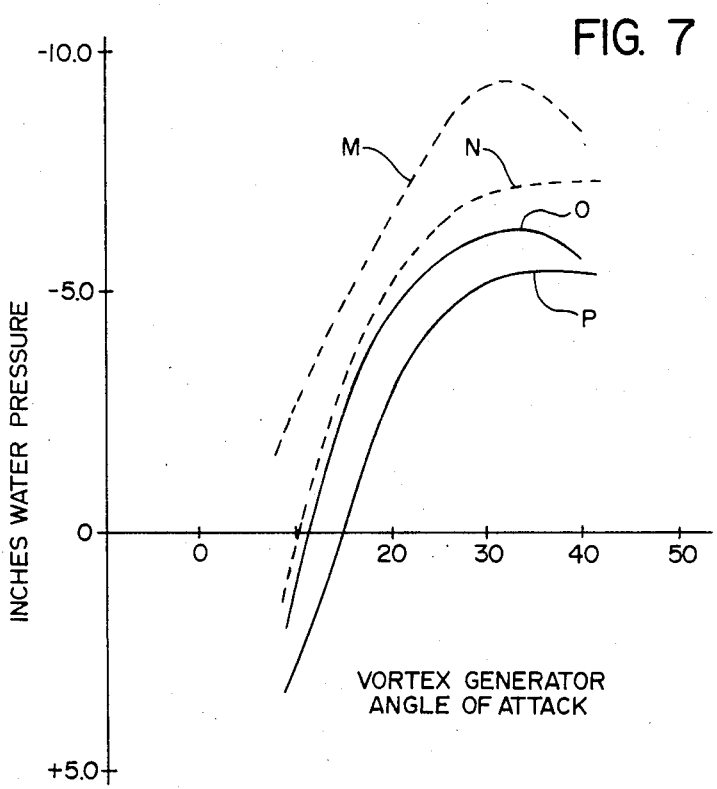

VORTEX GENERATOR

BACKGROUND OF THE INVENTION

1. Field of the Invention

The present invention relates to vortex generators, and more particularly to vortex generators mounted to substantially continuous aerodynamic surfaces to energize boundary layer air to at least partially alleviate the onset of separated flow over the surfaces.

2. Background Art

It has long been known that aerodynamic performance can be improved by generating vortices at selected locations on aerodynamic surfaces. For example, it is a common practice to place vortex generators at certain selected locations on an upper surface of an airfoil to extend the onset of flow separation. By creating the vortex, the high momentum fluid particles outside the boundary layer are mixed with the retarded boundary layer air at the surface, thus avoiding or extending the occurence of separated flow.

A common type of prior art vortex generator is in the form of a small rectangular plate, with the plane of the plate extending vertically upward from the wing surface and slanted moderately relative to the direction of air flow. Another type of prior art vortex generator also has an upright planar configuration, but has its leading edge slanting in an upward and rearward direction to the forward point of the top edge of the vortex generator, and with the top edge extending generally horizontally and rearwardly from the leading edge. Thus, in side elevation, the configuration of the vortex generator comprises a forward triangular portion and a rear rectangular portion, both the triangular and rearward rectangular portions being aligned with one another.

A search of the patent literature has revealed a number of patents. These are the following:

U.S. Pat. No. 2,532,753, Beman, shows a particular configuration of a wing where there is a plurality of fences or ridges positioned in tapered depressions formed in the aft section of the wing.

U.S. Pat. No. 2,800,291, Stephans, shows devices which are alleged to beneficially affect the problems of boundary layer flow in a manner to delay or prevent a separation by maintaining thinness of the boundary layer over a relatively greater distance. These devices are generally triangularly shaped, with the broader base of the triangle having a shallow height dimension and with the height of the tapering triangle increasing in a rearward direction of flow.

U.S. Pat. No. 3,129,908, Harper, shows a plurality of bladder-like devices mounted to the top surface of an airfoil. These bladders can be inflated to change the camber of the airfoil.

U.S. Pat. No. 3,288,399, Gaster, shows a device used on a swept leading edge to prevent spanwise propagation of a turbulent boundary layer. There is a forward relatively blunt portion, and the trailing rearwardly sloping portion blends smoothly into the leading edge.

U.S. Pat. No. 3,438,597, Kasper, shows an aircraft design where there are at the outer tips of the wings vertical stabilizers.

U.S. Pat. No. 3,463,418, Miksch, shows a vortex generating device mounted to an upper forward surface portion of a wing. This device has, in cross-sectional configuration taken parallel to the leading edge, a generally corrugated configuration.

U.S. Pat. No. 3,471,107, Ornberg, shows a device for stabilizing the two leading edge vortices that are formed at each side of the centerline of a thin, sharply swept-back delta wing. The oppositely rotating vortex is generated by a triangle plate projecting upwardly from the suction surface, or by a slot opening to the suction surface from which pressurized air issues.

U.S. Pat. No. 3,578,264, Kuethe, shows a device for amplifying streamwise vortices, making use of the effect known as the "Taylor-Goertler Instability" which results in streamwise vortex generation where a fluid is caused to flow over a concave surface. A second or following properly spaced concave surface results in the amplification of the vortex.

U.S. Pat. No. 3,744,745, Kerker et al, shows a pair of lifting vanes attached to the sides of a nacelle to generate vortices which sweep from the nacelle upwardly over the upper surface of a wing.

U.S. Pat. No. 3,776,363, Kuethe, is intended to reduce the noise and instability due to the shedding of cross-stream vortices caused when air or fluid moves over the trailing edge of a plate, blade, vane or the like. The particular configuration of the vortex generators shown have a generally rounded cross-sectional configuration, in the form of a portion of a semi-circle.

U.S. Pat. No. 3,845,918, White, shows a vortex dissipating device for the tip of an airfoil or a hydrofoil in the form of a fixed plate secured to the tip and aligned with the free stream direction.

U.S. Pat. No. 4,067,518, Patterson et al, shows an aerodynamic body mounted on the wing trailing edge, having its maximum cross-section located approximately at the trailing edge. The greater portion of the body is located below the chord line of the wing. The patent alleges that this creates a strong, negative pressure at the wing trailing edge so as to provide suction of the adjacent upper surface boundary layer air, thus reducing its depth and hence reducing wing drag.

U.S. Pat. No. 4,238,094, McGann, shows a "fluid fence" mounted at the tip portions of an airfoil. The lower edge surface of each fence curves concavely, upwardly away from the wing surface.

U.S. Pat. No. 4,323,209, Thompson, shows a plurality of fingers extending forwardly from the leading edge of the wing. Each finger generates counter rotating vortices that come into contact with one another.

Canadian Patent No. 595,988, Gould et al, shows a vortex generator for an airfoil or the like where the leading edge of the vortex generator slants upwardly and rearwardly from the lower forward end of the leading edge, with the edge extending upwardly and then joining a rearwardly extending edge at a relatively sharp corner. Various other configurations, showing a variety of pointed and/or curved leading edges are illustrated in the latter portion of the drawings of that patent.

Swedish Patent No. 160,134, relates to vortices which are generated over a delta wing surface.

SUMMARY OF THE INVENTION

The vortex generator of the present invention is adapted to be mounted to a forward surface portion of a substantially continuous aerodynamic surface over which there is an airflow along a flow path from a forward surface portion where boundary layer air is at a predetermined thickness, to a rear surface portion of the aerodynamic surface where the airflow has greater tendency to become separated.

The vortex generator comprises a lower mounting member adapted to be mounted to the forward surface portion of the aerodynamic surface. There is a second main vortex generating member having a generally planar configuration and adapted to be positioned in a plane having a first substantial vertical alignment component perpendicular to the aerodynamic surface, and having a second substantial horizontal alignment component generally aligned with the flow path, but slanted relative to the flow path at an angle at which a desired vortex is generated to energize the airflow adjacent to the rear surface portion.

The main vortex generating member comprises a forward portion having a forward edge portion comprising a first forward edge section extending upwardly and rearwardly from the second aerodynamic surface. The forward edge portion also comprises a second forward edge section which is a substantial rearward continuation of the first section and which extends rearwardly in a convex curve that becomes more horizontal in a rearward direction.

The main vortex generating member further comprises a rear portion aerodynamically aligned with, and extending rearwardly from, the forward portion. The rear portion has a rear upper edge portion which is a substantial rearward extension of the second forward edge section and which is substantially horizontally aligned.

The main vortex generating member has a height dimension and a forward to rear length dimension, with the height dimension being between 0.2 to 0.5, and desirably between about 0.25 to 0.3, of the length dimension.

Also, the forward portion of the main vortex generating member has a length dimensioned which is desirably between about 0.2 to 0.6, and more preferably between about 0.25 to 0.35, of the length dimension of the main vortex generating member.

The first forward edge section desirably meets the aerodynamic surface to which the vortex generator is mounted at an angle between about 30° to 60°, with the angle desirably being about one-half of a right angle.

The rear upper edge portion can be slanted in an upward and rearward direction, with the angle of slant to the aerodynamic surface being between about 0° to 10°.

Desirably, the curve of the forward edge portion is contoured in a spline curve.

In a preferred configuration, the vortex generator is mounted to an upper aerodynamic surface of a wing. In a mode of operation for optimized operation of said vortex generator, at which said upper surface has a predetermined boundary layer thickness and a predetermined boundary layer displacement thickness, the height of the vortex generator is about ⅜ to five times the boundary layer thickness at the mounting location, and desirably about one to one and one-half times the boundary layer thickness during optimized operation of the vortex generator. Relative to boundary layer displacement thickness (i.e., delta star $\delta^*$), the height of the vortex generator is between about 2 to 12 times, and desirably about 3 to 5 times, boundary layer displacement thickness during the mode of operation at which the vortex generator is yielding its improved results.

Other features of the present invention will become apparent from the following detailed description.

BRIEF DESCRIPTION OF THE DRAWINGS

FIG. 5 is a cross sectional view of the vortex generator of the present invention, taken along line 5—5 of FIG. 4;

FIG. 6 is an isometric view of the vortex generator of the present invention; and FIG. 7 is a graph illustrating the performance of the vortex generator of the present invention in comparison with the prior art vortex generators shown in FIGS. 2 and 3.

DESCRIPTION OF THE PREFERRED EMBODIMENT

It is believed that a clearer understanding of the present invention will be achieved by first describing generally a typical application of vortex generators as applied to an upper surface of a wing 10. Then there will be a description of two prior art vortex generators that have been commonly used in aircraft, after which there will be a description of the present invention.

Figure 1:
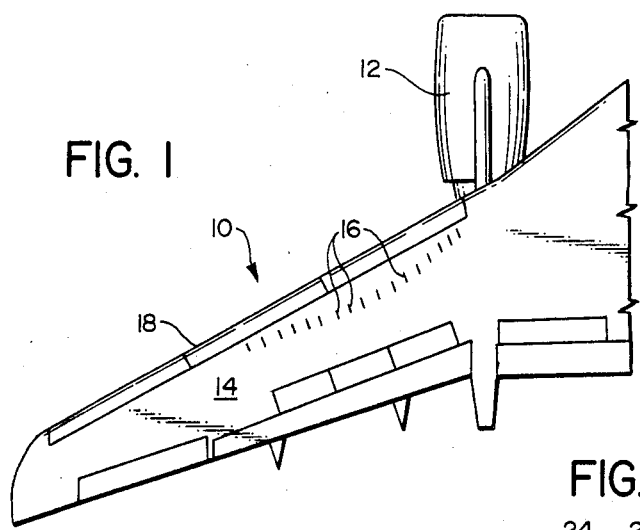
FIG. 1 is a top elevational view of a swept wing of a subsonic aircraft, illustrating generally a plurality of vortex generators mounted to the top surface of the wing.

In FIG. 1 there is shown a prior art subsonic swept wing 10, having a jet engine 12 mounted forwardly of the wing 10 and moderately below the wing 10. The wing 10 has an upper surface 14, and a plurality of vortex generators 16 are mounted to the top surface 14 a moderate distance rearwardly of the wing leading edge 18.

As air flows over the leading edge 18 and along the upper surface 14, there is in certain circumstances a tendency for the flow to separate as the air flows rearwardly over the upper wing surface 14. This onset of separation can be especially disadvantageous when the wing is in a high lift mode of operation (e.g., in executing a turn or climbing). It has long been known that the onset of separation can be extended to a further rearward location by the use of vortex generators, such as indicated at 16. These vortex generators are generally quite small (e.g., having a height dimension of no greater than approximately one inch or ½% of the wing chord length, and a length dimension possibly no greater than about five times the height of dimension, and these vortex generators 16 are strategically positioned on the wing to cause vortices to shed off the forward and upper edges of the vortex generators. As the vortices travel rearwardly over the upper wing surface 14, these cause the higher energy air outside of the boundary layer to swirl downwardly to mix with the boundary layer air so as to energize the same, and thus promote attached flow.

While the use of vortex generators can certainly produce desired aerodynamic results, there is the countervailing penalty of generating some increment of drag by reason of the vortex generator protruding into the airstream. Accordingly, it is desired to utilize vortex generators in a manner that a relatively strong vortex can be generated at the desired location, while minimizing any adverse aerodynamic effects, such as increased drag.

The present invention is based, at least in part, upon the recognition and analysis of certain problems existing with prior art vortex generators. Certain experimental and analytical work performed by the applicant in the present patent application has disclosed that in the prior art vortex generators analyzed, in addition to generating a primary vortex to achieve the desired aerodynamic result, there is the generation of one or more relatively small secondary vortices which tend to detract from the strength of the primary vortex. It has further been discovered that by shaping a vortex generator in accordance with the teachings of the present invention, such a secondary vortex or vortices can be substantially avoided, so that a relatively strong primary vortex is generated.

Figure 2:
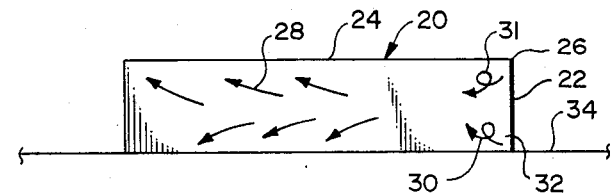
FIG. 2 is a side elevational view of a prior art vortex generator, having a rectangular configuration, and illustrating the manner in which secondary vortices are generated.

Reference is now made to FIG. 2, wherein there is shown a first type of prior art vortex generator 20, having a generally rectangular planar configuration, and having a vertical leading edge 22 and an upper horizontal edge 24, with these two edges 22 and 24 meeting at an upper forward 90° corner 26. The experimental and analytical work performed by the applicant herein has revealed that while a primary vortex (indicated at 28) is generated at the leading edge 22 and is augmented by the flow off the upper edge 24 (which acts as the "feeder line"), there is also the generation of two smaller secondary vortices 30 and 31. The vortex 30 appears to originate at or near the location (indicated at 32) where the lower part of the leading edge 22 meets the wing surface 34. The other vortex 31 is generated at or near the corner 26. The direction of rotation of the secondary vortices 30 and 31 are both opposite to that of the primary vortex 28, thus diminishing the strength of the primary vortex 28.

Figure 3:
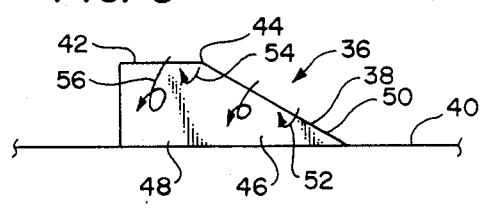
FIG. 3 is a side elevational view of a second type of prior art vortex generator where the forward portion has a generally triangular configuration, with an upwardly and rearwardly sloping leading edge.

A second type of prior art vortex generator is illustrated in FIG. 3 and is generally designated 36. This vortex generator 36 also has a generally planar configuration, but its leading edge 38 is in the form of an upwardly and rearwardly sloping straight line. This leading edge 38 makes an angle of approximately 45° with the underlying wing surface 40, or possibly an angle slightly less than 45°. The leading edge 38 meets an upper horizontal edge 42 at a point of intersection 44. Thus, the vortex generator 36 can be considered as having a forward triangular portion 46 and a rear rectangular portion 48, both of which are aligned in a single plane.

The experimental and analytical work performed by the applicant relative to this prior art vortex generator 36 has revealed that there is a tendency for a secondary vortex 52 to be generated at a location 50 moderately above the point where the leading edge 38 joins the wing surface 40. Another secondary vortex 54 tends to form at the upper point of intersection 44 of the leading edge 38 and upper edge 42. The direction of rotation of these vortices 52 and 54 is opposite to that of the primary vortex 56 generated by the vortex generator 36.

It has been found that the generation of such secondary vortices can be eliminated (or at least substantially alleviated) by properly forming the leading and upper edge portions of the vortex generator. The vortex generator 60 of the present invention has a flat plate-like mounting portion 62 which is attached to an underlying aerodynamic surface 64 and an upstanding main vortex generating portion 66. This vortex generating portion 66 has a generally planar configuration and is positioned in a plane having a substantial vertical alignment component perpendicular to the aerodynamic surface 64 and a second substantial horizontal component generally aligned with the flow path of the air over the aerodynamic surface. However, the horizontal alignment component is slanted relative to the flow path of the airstream at an angle at which a vortex of the desired strength is generated, without unnecessarily creating excessive aerodynamic drag. In general, the plane of the vortex generating portion 66 would be angled at about 10° to 30° from the direction of flow, and desirably at about 15°.

Figure 4:
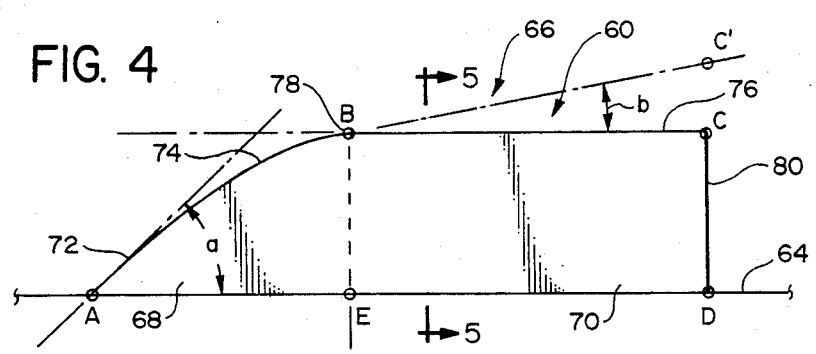
FIG. 4 is a side elevational view of the vortex generator of the present invention.

For purposes of description, the main vortex generating portion 66 can be considered as having a forward section 68 and a rear section 70. The forward section 68 has a forward edge which can be considered as being made up of first and second forward edge portions. The first forward edge portion 72 extends upwardly and rearwardly from the underlying surface 24 at an angle (indicated at "a" in FIG. 4). The second forward edge portion 74 that extends as a continuation of the first portion 72 in a convex curve that extends upwardly and rearwardly, with the curve becoming more horizontally aligned in a rearward direction.

The rear vortex generating section 70 has a generally rectangular configuration, and is substantially a planar continuation of the forward section 68. This rear section 70 has an upper generally horizontal edge 76 with the forward portion of the upper edge 76 blending into the rear end of the second forward edge portion 74 at a juncture point 78. The rear edge 80 of the rear section 70 is substantially vertical.

To described more particularly the configuration of the present invention, reference is again made to FIG. 4 where the point "A" designates the most forward point of the main vortex generating portion 66, which is the point of intersection of the first forward edge portion 72 with the aerodynamic surface 64. Point "B" is the point of intersection 78 of the rear forward edge portion 74 with the forward part of the upper edge 76. The point "C" is the upper rear point of intersection of the upper edge 76 and the rear edge 80. The point "D" is the lower point of intersection of the rear edge 80 and the aerodynamic surface 64. The point "E" is a point at the aerodynamic surface 64 which is directly below point "B". The forward section 68 is that portion of the main vortex generating portion 66 which is forward of the line B-E, while the rear section 70 is that part which is rearward of the line B-E.

Desirably, the angle "a" (which is the angle formed by the lower aerodynamic surface 64 and a line tangent to the first forward edge portion 72 at the point "A") is between about 30° to 60°, with an optimum angle being approximately 45°. The height to length ratio of the main vortex generating portion 66 (i.e., the ratio of the line C-D to the line A-D would be between about 0.20 to 0.50 with an optimum range being between about 0.25 to 0.30. The ratio of the length of the forward section 68 to the length of the entire main vortex generating portion 66 (i.e., the ratio of the line A-E to the line A-D) is between about 0.20 to 0.60, and desirably abetween 0.25 to 0.35).

The alignment of the upper edge 76 (i.e., the alignment of the line B-C) is substantially horizontal (i.e., substantially parallel to the line A-D), but can have a moderate upward and rearward slant, as indicated by the broken line B-C'. The upward slant would generally be between 0° to 10°, and this is indicated by angle "b" in FIG. 4.

The preferred curvature of the first and second forward edge portion 72-74 is that of a spline curve, where the slope of that curve is defined at points A and B.

The vortex generator is slanted so that the vertical surface 81 that faces the mounting portion 62 is the surface which faces at a slant into the oncoming airstream. The opposite vertical surface 82 is the surface behind which the primary vortex is generated.

The size of the vortex generator 60 depends on several factors. The height dimension of the vortex generator 60 should be such that it extends beyond the boundary layer and into the free stream a sufficient distance to be able to cause the vortex to capture the higher energy air outside of the boundary layer and move this air close to the aerodynamic surface. If the boundary layer is measured as total boundary layer (i.e., the upper limit being where the air velocity is at free stream velocity), the height dimension of the vortex generator 60 would be about ⅔ to five times, and desirably about one to one and one-half times, boundary layer thickness (i.e., delta, $\delta$) and between about 2 to 12 times, and desirably about 3 to 5 times, boundary layer displacement thickness, (delta star, $\delta^*$). The delta star ($\delta^*$) boundary layer displacement thickness is defined as the displacement of the streamlines around the body as a result of the reduced velocity in the boundary layer. The length of the vortex generator is optimized to provide proper strength to the vortex, but is not made excessively long so as to increase drag, without a corresponding benefit of the strength of the vortex.

It is to be understood that the predetermined boundary layer thickness and also the predetermined boundary layer displacement thickness relative to which the vortex generator is to be sized, will depend upon the mode of operation at which the vortex generator is to produce its desired result. For example, quite often the vortex generators are mounted to an upper surface of a wing specifically to improve performance of the wing (i.e., alleviate the onset of separated flow) when the wing is in a high lift mode of operation, such as in gaining altitude or possibly executing a banked turn. Under such circumstances, the predetermined boundary layer thickness (and also the boundary layer displacement thickness) would be greater. In other instances, a vortex generator may be added to improve performance during cruise configuration, during which the boundary layer thickness (and the boundary layer displacement thickness) would be smaller. It is with respect to this predetermined thickness at the mode of operation at which the vortex generator is intended to operate to optimize performance that the dimensions of the vortex generator are determined.

To demonstrate the effectiveness of the present invention, the two prior art vortex generators shown in FIGS. 2 and 3, and also the vortex generator of the present invention were tested in a wing tunnel. The rectangular vortex generator (i.e., the one shown in FIG. 2) has a height dimension of two inches and a length dimension of eight inches. The prior art vortex generator shown in FIG. 3 had a height dimension of about two inches and a length dimension of between about five to six inches. The vortex generator of the present invention had a height dimension of about 2" and a length dimension of about 8".

Each of these vortex generators was placed upon a flat aerodynamic surface and positioned in the wind tunnel. The vortex generators were made substantially larger than the vortex generators that would be used for an actual aircraft, mainly to permit better observation of the results of the wind tunnel testing. First, the rectangular prior art vortex generator and the vortex generator of the present invention were tested with no steps being taken to affect the boundary layer of the flow over the aerodynamic base surface, so that the boundary layer over the aerodynamic surface was quite thin. The strength of the vortex, measured in terms of a negative pressure value as equivalent to inches of water, was determined. The pressure resulting from the vortex generator of the present invention is indicated at "M", and that of the rectangular prior art vortex generator indicated at "N". It can readily be seen that the strength of the vortex created by the present invention was substantially stronger than that created by the prior art vortex generator.

To determine performance under conditions simulating more closely use in an actual aircraft, the boundary layer thickness over the aerodynamic surface of the base plate was artificially thickened by placing serrated plates upstream of the flow which passed over the plate. The resulting strength of the vortices generated by the vortex generator of the present invention and those of the prior art rectangular vortex generator are indicated by the solid curves "O" and "P". It can be seen that the thickening of the boundary layer reduced the strength of the vortex in each instance, but the strength of the vortex generated by the present invention was substantially greater than that of the prior art rectangular plate.

Due to time limitations in the wind tunnel testing, only limited testing was available for the second prior art vortex generator (i.e., the vortex generator shown in FIG. 3, having the triangularly-shaped forward portion). This testing indicated, however, that the vortex generated by this second prior art vortex generator (i.e., that of FIG. 3) was substantially weaker than that generated by the vortex generator of the present invention.

Further, by use of conventional flow visualization techniques, the vortex patterns generated by each of these three generators was analyzed. This revealed the formation of the secondary vortices in both of the prior art vortex generators.

The vortex generator of the present invention was found to have no observable secondary vortex generated. Rather, the primary vortex began to form at the forward leading edge portion (i.e., point A in FIG. 4), and the vortex flow was strengthened by flow along the feeder line (i.e., the entire upper edge portion extending from point A, through point B to point C).

It is to be understood that while it is believed that the hypothesis for the improved results of the present invention has a sound theoretical basis, regardless of the accuracy or completeness of this hypothesis, it has been found experimentally that the vortex generator of the present invention does provide improved results, in terms of the strength of the vortex generated. In other words, it is believed that the reason for the improved results of the present invention is the elimination of the secondary vortices. However, there may be other phenomena which have contributed to the improved results obtained by the present invention. At any rate, as indicated above, regardless of what is or may be the full and complete explanation for these improved results, it has been demonstrated these can be achieved by use of the vortex generator of the present invention.

It is to be understood that various modification could be made to the present invention without departing from the basic teachings thereof.

What is claimed is:

1. A vortex generator adapted to be mounted to a forward surface portion of a substantially continuous aerodynamic lifting surface over which there is an airflow along a flow path from the forward surface portion where boundary layer air is at a generally predetermined thickness, to a rear surface portion of the aerodynamic surface where the airflow has greater tendency to become separated, with said vortex generator being positioned, relative to said lifting surface, to generate a vortex which travels rearwardly over, and adjacent to, said lifting surface to promote attached flow thereover, said vortex generator comprising:

a. a first lower mounting member adapted to be mounted to the forward surface portion of the aerodynamic surface;
   b. a second main vortex generating member having a generally planar configuration and adapted to be positioned in a plane having a first substantial vertical alignment component perpendicular to the aerodynamic surface, and a second substantial horizontal alignment component generally aligned with the flow path, but slanted relative to said flow path at an angle at which a desired vortex is generated to energize the airflow adjacent to the rear surface portion, said main vortex generating member comprising:
      1. A forward portion having a forward edge portion comprising a substantially linear first forward edge section having a forward lower end positioned adjacent the lifting surface andextending upwardly and rearwardly from said aerodynamic surface and from said forward lower end, and a second forward edge section which is a substantial rearward continuation of the first section and which extends rearwardly in a continuous convex curve that becomes more horizontal in a rearward direction, said second forward edge section having a forward end which is substantially tangent to a rear end of said first foreward edge section, said first and second forward edge sections each having its entire length extending in a rearward direction from the forward lower end of the first forward edge section,
      2. a rear portion aerodynamically aligned with, said extending rearwardly from, said forward portion, said rear portion having a rear upper edge portion which is a substantial rearward extension of said second forward edge section and which is substantially horizontally aligned, said rear upper edge portion having a forward end which is substantially tangent to rear end of said second forward edge section.

2. The vortex generator as recited in claim 1, wherein said main vortex generating member has a height dimension and a forward to rear length dimension, with said height dimension being between about 0.2 to 0.5 of said length dimension.

3. The vortex generator as recited in claim 2, wherein the height dimension is approximately 0.25 to 0.3 of the length dimension.

4. The vortex generator as recited in claim 1, wherein said main vortex generating member has a length dimension, and the forward portion of the main vortex generating member has a length dimension, the length dimension of the forward portion being between about 0.2 to 0.6 of the length dimension of the main vortex generating member.

5. The vortex generator as recited in claim 4, wherein the length dimension of the forward portion is between about 0.25 to 0.35 of the length dimension of the main vortex generating member.

6. The vortex generator as recited in claim 1, wherein the first forward edge section meets said aerodynamic surface at an angle which is between about 30° to 60°.

7. The vortex generator as recited in claim 6, wherein said angle is approximately half a right angle.

8. The vortex generator as recited in claim 1, wherein said rear upper edge portion is slanted in an upward and rearward angle from said aerodynamic surface between about 0° to 10°.

9. The vortex generator as recited in claim 8, wherein said first and second forward edge sections are curved in a spline curve.

10. The vortex generator as recited in claim 1 wherein
    (a) said main vortex generatimg member has a height dimension and a forward to rear length dimension, with said height dimension being between about 0.2 to 0.5 of said length dimension and
    (b) the main vortex generating member has a length dimension, and the forward portion of the main vortex generating member has a length dimension, the length dimension of the forward portion being between about 0.2 to 0.6 of the length dimension of the main vortex generating member.

11. The vortex generator as recited in claim 10, wherein:
    (a) the height dimension is approximately 0.25 to 0.3 times the length dimension,
    (b) the length dimension of the forward portion is between about 0.25 to 0.35 of the length dimension of the main vortex generating member.

12. The vortex generator as recited in claim 11, wherein:
    (a) said rear upper edge portion is slanted in an upward and rearward angle from the horizontal between about 0° to 10°,
    (b) said first and second forward edge sections are curved generally in a spline curve.

13. The vortex generator as recited in claim 11, wherein said vortex generator is mounted at a mounting location to an upper aerodynamic surface of a wing, and with the wing in a mode of operation for optimized operation of said vortex generator at which said upper surface has a predetermined boundary layer displacement thickness, a height dimension of said vortex generator is between about 2 to 10 times boundary displacement layer thickness at said mounting location.

14. The vortex generator as recited in claim 13, wherein the height dimension of the vortex generator is approximately 3 to 5 times boundary layer displacement thickness at said mounting location.

15. The vortex generator as recited in claim 10, wherein said vortex generator is mounted at a mounting location to an upper aerodynamic surface of a wing, and with the wing in a mode of operation for optimized operation of said vortex generator at which said upper surface has a predetermined boundary layer displacement thickness, a height dimension of said vortex genertor is between about 2 to 10 times boundary layer displacement thickness at said mounting location.

16. The vortex generator as recited in claim 15, wherein the height dimension of the vortex generator is approximately 3 to 5 times boundary layer displacement thickness at said mounting location.

17. The vortex generator as recited in claim 1, wherein said vortex generator is mounted at a mounting location to an upper aerodynamic surface of a wing, and with the wing in a mode of operation for optimized operation of said vortex generator at which said upper surface has a predetermined boundary layer displacement thickness, a height dimension of said vortex generator is between about 2 to 10 times boundary layer displacement thickness at said mounting location.

18. The vortex generator as recited in claim 17, wherein the height dimension of the vortex generator is approximately 3 to 5 times boundary layer displacement thickness at said mounting location.

19. The vortex generator as recited in claim 1, wherein said vortex generator is mounted at a mounting location to an upper aerodynamic surface of a wing, and with the wing in a mode of operation for optimized operation of said vortex generator at which said upper surface has a predetermined boundary layer thickness, a height dimension of said vortex generator is between about ⅜ to 5 times bounday layer thickness at said mounting location.

20. The vortex generator as recited in claim 19, wherein the height dimension of the vortex generator is approximate 1 to 1½ times boundary layer thickness at said mounting edge.

* * * * *